US010934452B2

(12) United States Patent
Patel et al.

(10) Patent No.: US 10,934,452 B2
(45) Date of Patent: Mar. 2, 2021

(54) RESIN FORMULATION AND USE THEREOF AS A SURFACE MARKER

(71) Applicant: Illinois Tool Works Inc., Glenview, IL (US)

(72) Inventors: Naresh B. Patel, Bridgewater, NJ (US); Michael J. Cherpinsky, Eatontown, NJ (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 340 days.

(21) Appl. No.: 15/801,700

(22) Filed: Nov. 2, 2017

(65) Prior Publication Data

US 2018/0134914 A1 May 17, 2018

Related U.S. Application Data

(60) Provisional application No. 62/421,042, filed on Nov. 11, 2016.

(51) Int. Cl.
*C09D 167/02* (2006.01)
*C09D 5/00* (2006.01)
*C09D 7/61* (2018.01)
*C08J 3/09* (2006.01)
*C09D 167/06* (2006.01)
*C09D 5/33* (2006.01)
*C09D 7/20* (2018.01)
*C09D 7/41* (2018.01)
*C08G 63/547* (2006.01)
*C09D 7/40* (2018.01)
*C08G 63/193* (2006.01)
*C09D 7/65* (2018.01)

(52) U.S. Cl.
CPC .............. *C09D 167/02* (2013.01); *C08J 3/09* (2013.01); *C09D 5/00* (2013.01); *C09D 5/004* (2013.01); *C09D 7/61* (2018.01); *C09D 167/06* (2013.01); *C08G 63/193* (2013.01); *C08G 63/547* (2013.01); *C08J 2367/02* (2013.01); *C09D 7/20* (2018.01); *C09D 7/41* (2018.01); *C09D 7/65* (2018.01); *C09D 7/70* (2018.01)

(58) Field of Classification Search
CPC ........ C09D 5/00; C09D 5/004; C09D 167/02; C09D 167/06
See application file for complete search history.

(56) References Cited

U.S. PATENT DOCUMENTS

| 3,351,611 | A | 11/1967 | Conix |
| 7,820,755 | B2 | 10/2010 | Patel |
| 2006/0030631 | A1 | 2/2006 | Shah et al. |

FOREIGN PATENT DOCUMENTS

| DE | 19648756 A1 * | 5/1998 | ......... C08G 18/6625 |
| DE | 102007034866 A1 * | 1/2009 | ........... C09D 167/06 |
| DE | 102007034866 A1 | 1/2009 | |
| JP | H05157706 A | 6/1993 | |
| JP | 2947918 B2 * | 9/1999 | |
| JP | 2947918 B2 | 9/1999 | |
| WO | 03074281 A1 | 9/2003 | |
| WO | 2009029095 A1 | 3/2009 | |

OTHER PUBLICATIONS

Muller et al. Biodegradation of polyesters containing aromatic constituents, J. Biotech, 86 (2001) pp. 87-95. (Year: 2001).*
European Search Report dated Mar. 29, 2018 for European Application No. EP 17200669 filed Nov. 8, 2017.
European Search Report dated Feb. 4, 2019 for European Application No. 18198822 filed Oct. 5, 2018.

* cited by examiner

Primary Examiner — Kelly M Gambetta
(74) Attorney, Agent, or Firm — Blue Filament Law PLLC

(57) ABSTRACT

A surface marker resin formulation is provided that includes a linear aromatic polyester or a co-polymer thereof present in an amount of 10 to 45 total weight percent. The resin is dissolved or dispersed in a solvent. A colorant package is also dissolved or dispersed in the solvent. Upon drying of the solvent a mark is provided on a surface that can alert a user as to relative movement between articles defining the surface. A process of marking a surface includes two articles being brought into a pre-selected alignment to define a surface. A continuous bead is applied to the surface. The solvent evaporates to a state of dry-to-touch in a time of between 1 and 30 minutes to mark the surface.

19 Claims, No Drawings

RESIN FORMULATION AND USE THEREOF AS A SURFACE MARKER

RELATED APPLICATIONS

This application is a non-provisional application that claims priority benefit of U.S. Provisional Application Ser. No. 62/421,042 filed Nov. 11, 2016; the contents of which are hereby incorporated by reference.

FIELD OF THE INVENTION

The present invention in general relates to resin formulation and in particular, to resin formulation that dries under standard temperature and pressure to form a coating amenable for use as a marker with rapid drying compared to the prior art.

BACKGROUND OF THE INVENTION

Inspection paints are used in myriad applications to visually detect movement or tampering. Such paints are configured to adhere to, and form a breakable marking seal between, adjacent items that may undergo relative movement. For example, inspection paints may be applied to compression fittings, baseplates, studs, nuts, bolts, screws, fasteners, instrument and gauge housings and calibration mechanisms, parts and numerous other assemblies. Once dry, inspection paints become brittle and will crack if disturbed. Thus, when applied to adjacent items, inspection paints may be used to determine whether the two items have undergone relative movement. As a result, such pens are used extensively, in complex assembly and maintenance associated with aircraft, engines, and vehicles.

By way of example, inspection paints may be applied to the lug nuts attaching a vehicle wheel to an axle. Once the lug nuts are applied to the studs and properly torqued, inspection paint may be applied across the stud and the lug nut. Should the lug nut happen to loosen from the stud as a result of vibration or other means, the inspection paint marking will break, signaling that the lug nut has loosened. Similarly, an inspection paint may be applied to screws fastening the sealed chassis of an electronic device, such as a television. If the chassis is opened without authorization, the inspection paint marking will break, indicating a potential warranty tampering situation.

While state-of-the art current surface marker formulations sold under the tradename CROSS CHECK™ have numerous attractive attributes including drying to a hard film, compliance with BOEING® specification BMS8-45, adhesion to many substrates, and resistance to several common cleaning solvents. U.S. Pat. No. 7,820,755 is representative of such formulations. Nevertheless, there is a trend towards phosphate ester based hydraulic fluids and other fluid changes to improve the environmental and safety of vehicles. There hydraulic fluids and operational fluids are often characteristics by improved fire resistance and improved longevity/thermal operation profiles, relative to conventional alkane based fluids. Representative of conventional phosphate ester hydraulic fluids are SKYDROL® 5 and PE-5, and HYJET V®, produced by Eastman Chemical and Exxon, respectively. As a result, existing surface marker formulations likewise need to adjust to the requirements of quick drying and modified types of solvent resistance.

Thus, there exists a need for a surface marker formulation that is compatible with contact with phosphate ester based hydraulic fluids. There further exists a need for such a marker formulation that dries to a hard film and does so on a time scale compatible with assembly and maintenance work flow.

SUMMARY OF THE INVENTION

A surface marker resin formulation is provided that includes a linear aromatic polyester or a co-polymer thereof containing at least 40 monomer percent of aromatic polyester subunits present in an amount of 10 to 45 total weight percent. The resin is dissolved or dispersed in a solvent. A colorant package is also dissolved or dispersed in the solvent. Upon drying of the solvent a mark is provided on a surface that can alert a user as to relative movement between articles defining the surface.

A process of marking a surface includes two articles being brought into a pre-selected alignment to define a surface. A continuous bead is applied to the surface. The solvent evaporates to a state of dry-to-touch in a time of between 1 and 30 minutes to mark the surface. Often the surface is a torqued interface between the articles, as found on vehicles. The formulation is readily applied from a pen to achieve a controlled bead width. The drying of the formulation by solvent evaporation can occur in 1 to 2 minutes under standard temperature and pressure. The resulting mark can withstand at least one hour of immersion contact with a phosphate ester.

DETAILED DESCRIPTION OF THE INVENTION

The present invention has utility as surface marker formulation and a marker pen containing such a formulation that is able to afford tamper indicating markings to a variety of substrates associated with vehicles, including torque indication. In inventive formulation is resistant to immersion in phosphate ester hydraulic fluid for more than 60 minutes after drying. In some inventive embodiments, an inventive formulation is dry to the touch in 120 seconds or less, as measured at standard temperature and pressure (STP). An inventive formulation accepts a variety of conventional pigment and dye packages to provide a spectrum of colors and levels of fluorescence.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

An inventive surface marker formulation is based on a solvent dispersed resin that dries on a target substrate to a desired film that retains a pigment or dye package on the substrate and is resistance to phosphate ester degradation. The formulation includes a pigment or a dye; and in certain invention embodiments, at least one of: an anti-skinning additive, a synthetic drier, a wetting additive, a gelled viscosity builder additive and a rheological additive.

In contrast to the prior art of U.S. Pat. No. 7,820,755 that is based on a polyurethane (urethane alkyd polymer) resin, the present invention invokes polyester resins that are linear aromatic polyesters, and co-polymers thereof, containing at least 40 monomer percent of aromatic polyester subunits. Linear aromatic polyester synthesis and structures are illustratively detailed in U.S. Pat. No. 3,351,611. In other inventive embodiments, the monomer percent of aromatic polyester subunits is between 50 and 90 percent. In still other inventive embodiments, a linear aromatic polyester is aliphatically saturated. It is appreciated that a linear aromatic polyester operative herein is either amorphous or crystalline. In still other inventive embodiments, the linear aromatic polyester has a glass transition temperature (Tg) of between 60° C. and 120° C., and in still other inventive embodiments, Tg of between 65° C. and 110° C. In still other inventive embodiments, the linear aromatic polyester has a hydroxyl number from 2 to 80 mg/g KOH/g. In still other inventive embodiments, the linear aromatic polyester has a molecular weight of between 9,000 g/mol and 108,000 g/mol.

As used herein, polymer molecular weight is weight average molecular weight (Mw), unless otherwise specified.

Upon dispersion or dissolution of an inventive resin in a solvent along with a colorant package, an inventive formulation is amendable to provision to an end user in the form of a paint to be applied by brush or spray, as well as through inclusion with a marker tube. The construct of such a tube is conventional to the art, as sold under the brand name DYKEM® CROSS CHECK™. The resin is typically present from 10 to 45 total weight percent of a formulation and in specific inventive embodiments from 20 to 35 total weight percent. It has been found that solvent that is a mixture of ketones or esters with a less amount of an Aromatic 100, 150, or 200 in a weight ratio of 3-15:1 a provides for a marking that touch dries in less than 120 seconds. The resulting film is noted to be resistant to phosphate ester hydraulic fluids.

A colorant operative in the present invention illustratively includes titanium dioxide particulate, carbon black, iron oxides, phthalocyanine blue, azo dyes, anthraquinone dyes, manganese, phosphors, and combinations thereof. These pigments and dyes are amenable to dissolution or suspension in the solvated linear aromatic resin. A pigment or dye is present from 0.2 to 45 total weight percent of a complete formulation for application to a substrate. It is appreciated that while a dye can be operative in amounts as lows as 0.2 total weight percent, particulate pigments require larger quantities to affect coloring. In certain inventive embodiments, the colorant is present from 5 to 30 total weight percent. It is appreciated that a colorant package in some embodiments includes solvents, surfactants, non-foaming agents, and other conventional additives to facilitate storage and dispersion. Fluorescent or phosphorescent pigments and dyes are preferred as being visible to the unaided normal human eye under a variety of lighting conditions. A variety of such pigments and dyes are available from the DAYGLO Corporation, Cleveland, Ohio, USA. These colors illustratively include pink, yellow, blue, orange, and green.

The linear aromatic polyester resins of the present invention are dissolved or at least dispersed in a solvent. A solvent suitable for dissolution or dispersion of an inventive resin illustratively include halogenated hydrocarbons such as methylene chloride, chloroform, 1,2-dichloroethane, tetrachloroethane, methylchloroform, 1,1,2-trichloroethane; benzene; $C_7$-$C_{10}$ aromatics having a methyl group or groups attached to the ring in the ortho, meta, or para positions, naphthalenes; $C_3$-$C_8$ ketones, such as methyl ethyl ketone, acetone, and diacetone alcohol; cyclic $C_3$-$C_6$ ethers; ($C_1$-$C_4$)-O-($C_1$-$C_4$) ethers; ethylene glycol ethers; diethylene glycol ethers; $C_2$-$C_{14}$ alkyl esters of $C_2$-$C_8$ carboxylic acids, and combinations any of the aforementioned that are miscible. It is appreciated that racemic blends aromatics are operative herein that illustratively include Aromatic 100, Aromatic 150, Aromatic 200 or combinations thereof are operative herein. Solvent constitutes a major component by weight of a formulation prior to drying to a hard resin film containing colorant and thus is the remainder after inclusion of various additives to the formulation, yet is almost all removed from a vacuum dried film. Typically, solvent as a single component or mixture of miscible solvents is present from 15 to 89.8 total weight percent of a complete formulation for application to a substrate.

It is appreciated that the solvent of an inventive formulation will readily dissolve the machine oil commonly coating many metal parts thus allowing tamper or torque marking to occur with an inventive formulation without a degreasing step in common work settings. An inventive is capable of drying to the touch in between 1 and 30 minutes and in some inventive embodiments in less than 5 minutes or even less than 2 minutes so as not to impede repeated handling of the surface.

A thixotropic agent operative in the present invention illustratively includes fumed silica, organoclays, inorganic clays and precipitated silica. Multifunctional alcohols are commonly used to enhance thixotropic properties. A thixotropic agent is present from 0-15 percent by weight. The thixotropic agent is present in specific embodiments from 0.5 to 8 total weight percent of a complete formulation for application to a substrate. To the extent a multifunctional alcohol used, it is typically present from 1 to 5 weight percent of the thixotropic agent.

Fillers operative in the present invention illustratively include talc, mica, alumina trihydrate, calcium sulfate, calcium carbonate, magnesium sulfate, magnesium carbonate, barium sulfate, microspheres and the like. A filler is present from 0 to 30 percent of a complete formulation for application to a substrate. In certain inventive embodiments, the filler is present from 3 to 20 total weight percent.

A siccative additive is provided in some inventive embodiments to regulate the drying speed of the formulation. A siccative additive operative in the present invention illustratively includes a transition metal carboxylate for which medium- to long-chain linear or branched carboxylic acids—most commonly 2-ethyl hexanoic acid or various naphthenic acids are used as ligands, and combinations thereof. Transition metals typically include cobalt, zirconium, and manganese; and a routinely used in the printing industry as drying accelerators. A siccative additive is present from 0 to 3 percent of a complete formulation for application to a substrate. In certain inventive embodiments, the siccative additive is present from 0.5 to 2 total weight percent.

In some inventive formulations particularly well suited for application from a tube having an opening, the formulation is adjusted to not only have storage stability of at least 1 month and in some instances more than 3 months without appreciable separation, but also to have a viscosity in the range of 3,000 to 12,000 centipoise. The tube selectively sealed with a cap for extruding the formulation as a bead. The bead typically having a width of 3.2±1 millimeters (mm). An inventive formulation is summarized in the following Table 1.

TABLE 1

Inventive surface marker formulation in typical and specific versions, with amount as total weight percent.

| Ingredient | Typical Amount (%) | Specific Amount (%) |
|---|---|---|
| Linear aromatic polyester or copolymer | 10-45 | 20-35 |
| Colorant package | 0.2-45 | 5-30 |

TABLE 1-continued

Inventive surface marker formulation in typical and specific versions, with amount as total weight percent.

| Ingredient | Typical Amount (%) | Specific Amount (%) |
|---|---|---|
| Thixotropic agent | 0-15 | 0.5-8 |
| Filler | 0-30 | 3-20 |
| Siccative additive | 0-3 | 0.5-2 |
| Solvent | remainder | remainder |

The formulation is readily supplied in a marking tube. The marking tube is typically formed of aluminum and includes an opening to define a volume for containing the formulation. To preclude the formulation drying prematurely on the opening, a cap is selectively removable to expose the opening from which the formulation is dispensed as a bead. In this way, a controlled bead width is easily applied to a surface.

The present invention is further illustrated with respect to the following non-limiting examples:

EXAMPLE 1

A linear aromatic polyester resin having a Tg of 70° C. and a molecular weight of 60,000 that is amorphous is dissolved to 36 total weight percent in a solvent of methyl ethyl ketone (49 total weight percent) and Aromatic 100 (6 total weight percent) with 6 total weight percent hectorite clay and the remainder being thixotropic particulate. The resulting formulation is packed into in an aluminum tube and crimped using a conventional tube filling system and applied as a bead 3.2 millimeters (mm) in width and a thickness of 0.5 mm onto substrate panels of glass, mild steel, aluminum, ceramic, porcelain, acrylic, polyethylene, and polyamide without exhibiting sagging. The formulation dried in approximately 120 seconds to the touch. After drying overnight, the panels are immersed in SKYDROL® PE-5 hydraulic fluid and found to be unchanged after 72 hours.

EXAMPLES 2-6

The formulation of Example 1 is modified with inclusion of 21.2 total weight of DAYGLO® pink (Example 2, MC-11), or yellow (Example 3, MC-17), blue (Example 4, MC-19), orange (Example 5, MC-15), or green (Example 6, MC-18) fluorescent pigment and the concurrent proportional reduction in the other components of Example 1. The formulation of Examples 2-6 are applied to panels and tested per Example 1 with nearly identical results.

EXAMPLE 7

A saturated linear aromatic polyester having a Tg of approximately 105° C., acid number <3 mg KOH/g, OH number 5 mg/g KOH/g, and a molecular weight of 15,000 is dissolved to 28 total weight percent in a solvent of methyl ethyl ketone (38 total weight percent) and Aromatic 100 (4 total weight percent) and containing 21.2 total weight percent of the pink fluorescent pigment of Example 2 with 4 total weight percent hectorite clay and the remainder being thixotropic particulate. The formulation of Example 7 is applied to panels and tested per Example 1. The resulting drying markings on the panels withstand between 1 and 4 hours of immersion in SKYDROL® PE-5 hydraulic fluid without degradation.

Comparative Example A

Example 1 was repeated with the replacement of the resin with an equal amount of saturated linear aromatic polyester having a Tg of approximately 50° C., acid number <3 mg KOH/g, OH number ~5 mg/g KOH/g, and a molecular weight of 8,000. The resulting markings remained tacky and soft and were displaced by immersion in SKYDROL® PE-5 for one hour.

Comparative Example B

Example 1 was repeated with the replacement of the resin with an equal amount of B98 polyvinyl butral (PVB) BUTRA® (Eastman Chemical). The resulting markings remained tacky and soft and were displaced by immersion in SKYDROL® PE-5 for one hour.

Comparative Example C

Example 1 was repeated with the replacement of the resin with an equal amount of SARAN® F310: PVDC vinyl resin. The resulting markings remained tacky and soft and were displaced by immersion in SKYDROL® PE-5 for one hour.

Comparative Example D

Example 1 was repeated with the replacement of the resin with an equal amount of ELVACITE® 2041 Acrylic resin. The resulting markings remained tacky and soft and were displaced by immersion in SKYDROL® PE-5 for one hour.

Comparative Example E

Example 1 was repeated with the replacement of the resin with an equal amount of Dow Epoxy 1009 resin. The resulting markings remained tacky and soft and were displaced by immersion in SKYDROL® PE-5 for one hour.

Comparative Example F

Example 1 was repeated with the replacement of the resin with an equal amount of DYNAPOL® (Evonik) S1611 polyester resin. The resulting markings remained tacky and soft and were displaced by immersion in SKYDROL® PE-5 for one hour.

Comparative Example G

Example 1 was repeated with the replacement of the resin with an equal amount of Bostik 5833 polyester resin. The resulting markings remained tacky and soft and were displaced by immersion in SKYDROL® PE-5 for one hour.

Comparative Example H

Example 1 was repeated with the replacement of the resin with an equal amount of Toyobo 885 polyester resin. The resulting markings remained tacky and soft and were displaced by immersion in SKYDROL® PE-5 for one hour.

Comparative Example I

Example 1 was repeated with the replacement of the resin with an equal amount of 725 polyamide resin (Henkel) resin.

The resulting markings remained tacky and soft and were displaced by immersion in SKYDROL® PE-5 for one hour.

Comparative Example J

Example 1 was repeated with the replacement of the resin with an equal amount of 940 polyamide resin (Henkel) resin. The resulting markings remained tacky and soft and were displaced by immersion in SKYDROL® PE-5 for one hour.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The invention claimed is:

1. A surface marker resin formulation comprising:
    a linear aromatic polyester or a co-polymer thereof containing at least 40 monomer percent of aromatic polyester subunits, said linear aromatic polyester or a co-polymer thereof present from 10 to 45 total weight percent of said formulation, said linear aromatic polyester or a copolymer thereof being aliphatically saturated;
    a solvent in which said linear aromatic polyester or a co-polymer thereof is dissolved or dispersed, said solvent present from 15-89.8 total weight percent of said formulation;
    a colorant package dissolved or dispersed in said solvent, said colorant present from 0.2 to 45 total weight percent of said formulation.

2. The formulation of claim 1 wherein said linear aromatic polyester or a co-polymer thereof has a glass transition temperature of 60° C. and 120° C.

3. The formulation of claim 1 wherein said linear aromatic polyester or a co-polymer thereof is amorphous.

4. The formulation of claim 1 wherein said linear aromatic polyester or a co-polymer thereof has a hydroxyl number from 2 to 80 mg/g KOH/g.

5. The formulation of claim 1 wherein said linear aromatic polyester or a co-polymer thereof has a molecular weight of between 9,000 and 108,000.

6. The formulation of claim 1 wherein said solvent is at least one of:
    methylene chloride, chloroform, 1,2-dichloroethane, tetrachloroethane, methylchloroform, 1,1,2-trichloroethane; benzene, $C_7$-$C_{10}$ aromatics having a methyl group or groups attached to a $C_6$ ring, naphthalenes, $C_3$-$C_8$ ketones, cyclic $C_3$-$C_6$ ethers, $(C_1$-$C_4)$-O-$(C_1$-$C_4)$ ethers, ethylene glycol ethers, diethylene glycol ethers, or $C_2$-$C_{14}$ alkyl esters of $C_2$-$C_8$ carboxylic acids.

7. The formulation of claim 1 wherein said solvent comprises at least one of Aromatic 100, 150, or 200.

8. The formulation of claim 1 wherein said colorant package comprises a fluorescent pigment or dye.

9. The formulation of claim 1 further comprising a thixotropic agent present in an amount sufficient to yield a viscosity of a 3,000 to 12,000 centipoise for the formulation.

10. The formulation of claim 1 further comprising at least one additive of:
    a filler, a siccative, an anti-skinning agent, and a wetting agent.

11. A process of marking a surface comprising:
    bringing two articles into a pre-selected alignment to define a surface;
    applying the formulation of claim 1 to the surface as a continuous bead; and
    drying the formulation to a state of dry-to-touch in a time of between 1 and 30 minutes to mark the surface.

12. The process of claim 11 wherein the two articles are torqued to define the surface.

13. The process of claim 11 wherein the two articles are part of a vehicle.

14. The process of claim 13 wherein the vehicle is an airplane.

15. The process of claim 11 wherein said applying of the formulation is from a tube.

16. The process of claim 11 wherein said applying of the formulation is as a bead having a width of 3.2±1 millimeters.

17. The process of claim 11 wherein said drying occurs in 1 to 2 minutes under standard temperature and pressure.

18. The process of claim 11 further comprising checking the bead to determine if still continuous at a later time and after contact with a phosphate ester.

19. A marking tube comprising:
    a formulation of claim 1;
    a metal tube having an opening and defining a volume enclosing the formulation; and
    a cap selectively removable to expose the opening from which the formulation is dispensed as a bead.

* * * * *